E. C. ROLLINS.
PLANTER AND FERTILIZER DROPPER.
APPLICATION FILED APR. 7, 1909.
945,004.
Patented Dec. 28, 1909.
2 SHEETS—SHEET 1.
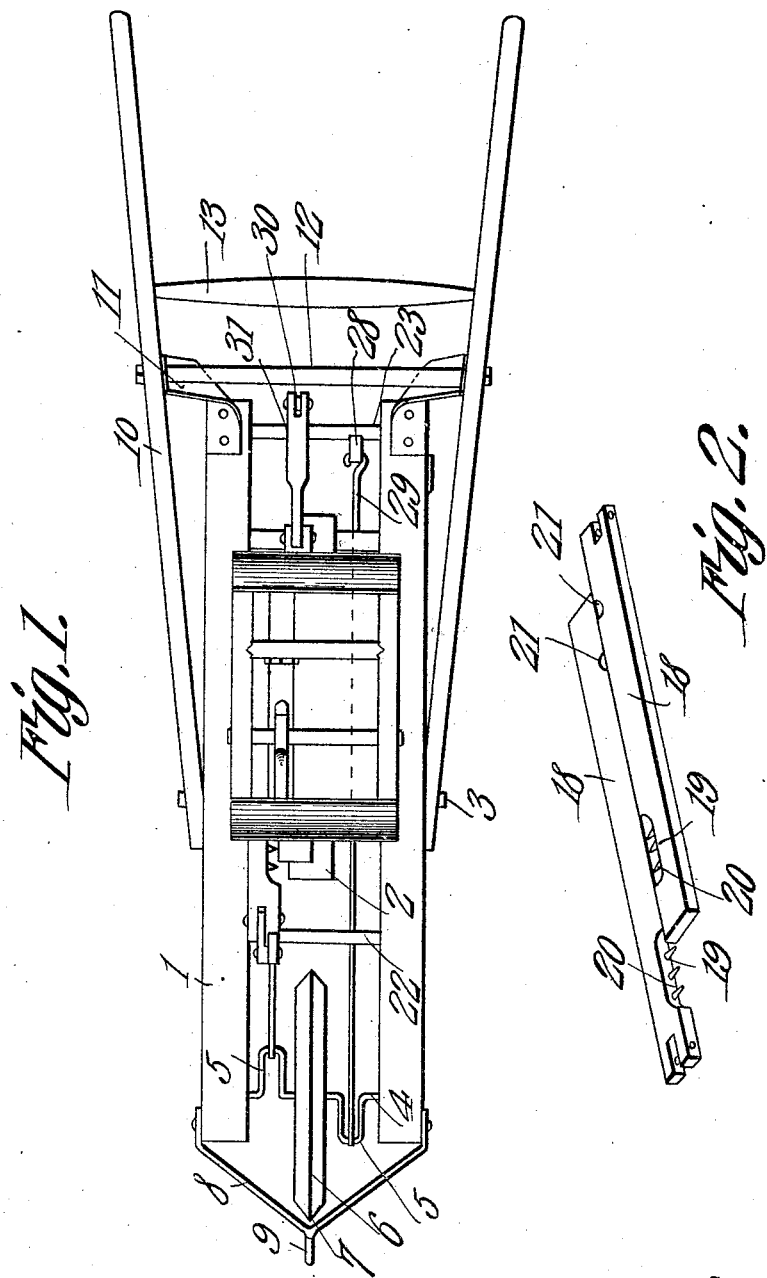
Witnesses
Inventor
Edgar C. Rollins.
By
Attorneys E. C. ROLLINS.
PLANTER AND FERTILIZER DROPPER.
APPLICATION FILED APR. 7, 1909.
945,004.
Patented Dec. 28, 1909.
2 SHEETS—SHEET 2.
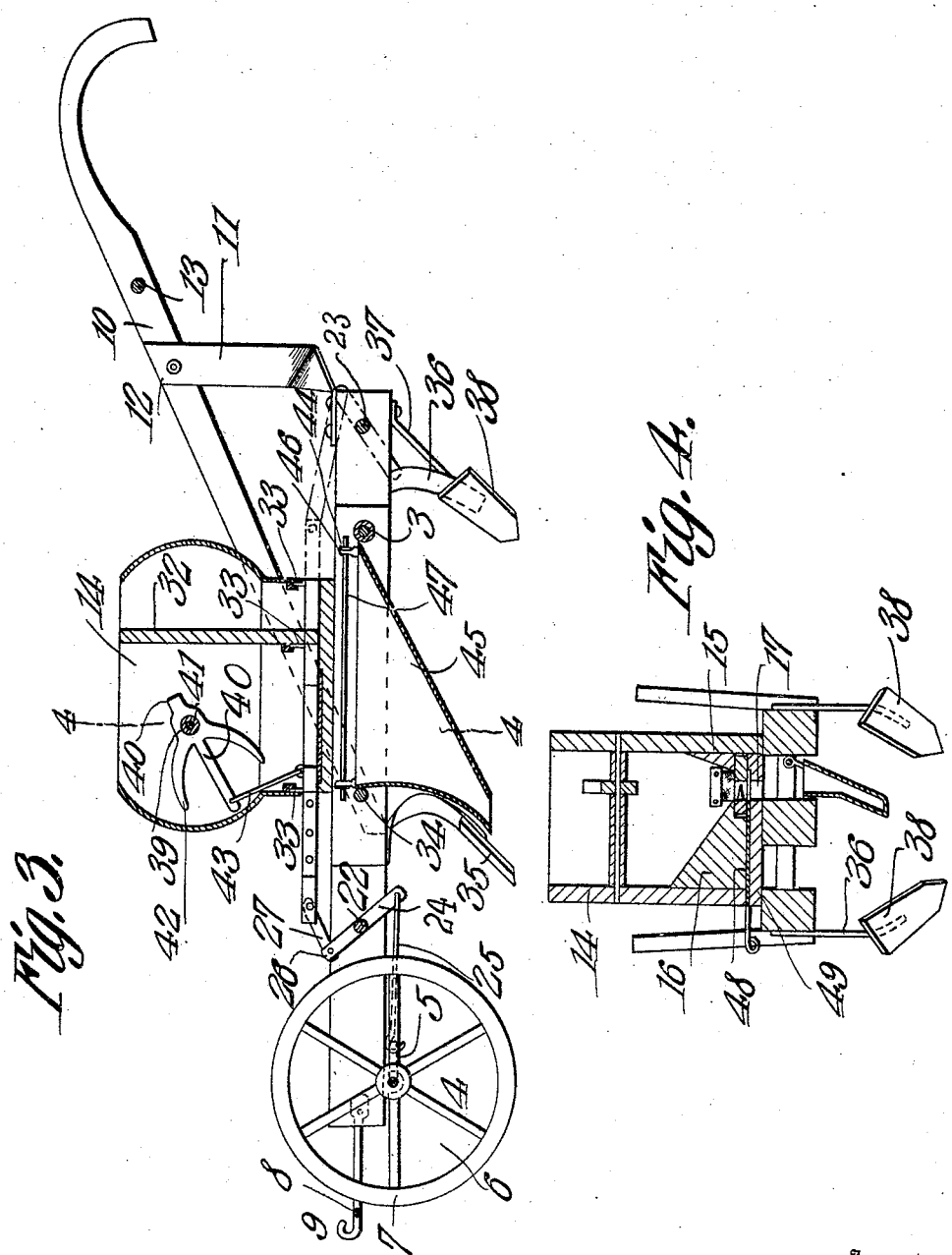
Witnesses
Inventor
Edgar C. Rollins.
By C.A. Snow & Co.
Attorneys

UNITED STATES PATENT OFFICE.

EDGAR C. ROLLINS, OF CALL, TEXAS, ASSIGNOR OF ONE-HALF TO FRANK M. ROBERTS, OF CALL, TEXAS.

PLANTER AND FERTILIZER-DROPPER.

945,004.

Specification of Letters Patent. Patented Dec. 28, 1909.

Application filed April 7, 1909. Serial No. 488,471.

*To all whom it may concern:*

Be it known that I, EDGAR C. ROLLINS, a citizen of the United States, residing at Call, in the county of Newton and State of Texas, have invented a new and useful Planter and Fertilizer-Dropper, of which the following is a specification.

This invention has relation to planters and fertilizer droppers, and it consists in the novel construction and arrangement of its parts, as hereinafter shown and described.

The object of the invention is to provide an implement of the character indicated which may be advantageously used for the purpose of dropping fertilizer, or for planting cotton or other kinds of seeds in which the separation of the material to be deposited, from the bulk thereof is accomplished through the medium of a pair of longitudinally disposed and movable strips, which are moved alternately in opposite directions, and which are provided with openings, through which the material from the containing portion of the implement may pass at intervals.

With the above object in view, and a further object in that an agitator is provided in the containing portion or hopper of the implement, and the said agitator is actuated through the longitudinal movement of one of the said strips.

In the accompanying drawings:—Figure 1 is a top plan view of the implement. Fig. 2 is a perspective view of the strips. Fig. 3 is a vertical sectional view of the implement. Fig. 4 is a transverse sectional view of the implement, cut on the line 4—4 of Fig. 3.

The combined planter and fertilizer dropper consists of parallel side beams 1 and an intermediate beam 2, located between the rear end portions of the said side beams 1. The beams 1 are spaced from the beam 2 and are held in proper relation to each other by means of cross bolts 3, illustrated in Fig. 3 of the drawings.

An axle 4 is journaled for rotation at the forward portions of the beams 1 and is provided at its opposite end portions with oppositely disposed cranks 5. A ground wheel 6 is fixed to the intermediate portion of the axle 4 and is located between the cranks 5, 5. The said ground wheel is provided with a V-shaped periphery 7. A draft yoke 8 is pivotally connected at its ends to the forward portions of the beams 1 and is provided at its middle with a suitable clevis hook 9.

Handles 10 are attached at their forward ends to the beams 1 at points intermediate of the ends of the latter and are held in inclined positions by means of braces 11, which are attached at lower ends to the said beams 1, and at their upper ends to a cross rod 12, lying between the handles 10 and attached at its ends to the said handles. A round 13 is secured at its ends to the handles 10, and serves as a further means for maintaining the said handles at a proper distance from each other.

A hopper 14 is mounted upon the beams 1 and 2 and is provided in its lower portion with longitudinally disposed blocks 15 and 16, which have inclined upper surfaces, the upper surface of the block 16 being longer than the upper inclined surface of the block 15. The hopper 14 is provided in its bottom with an opening 17. Slides 18 are slidably mounted along the bottom of the hopper 14 and over the opening 17 provided therein, and the inclined surfaces of the blocks 15 and 16 overlap the outer edge portions of the said slides 18. Each said slide 18 is provided in its edge and in the vicinity of one end with a relatively large recess 19, in which are located fingers 20. In the same edge and toward the opposite end portion, each slide 18 is provided with a relatively small recess 21. A shaft 22 is journaled at its ends in the beams 1 and is located in advance of the hopper 14, while a shaft 23 is journaled at its ends in the rear portions of the said beams 1 and is located behind the hopper 14. The shaft 22 is provided with a radially disposed arm 24, which is connected with one of the cranks 5 of the axle 4 by means of a connecting rod 25. The said shaft 22 is provided with another radially disposed arm 26, to the outer end of which is pivotally connected one end of a link 27, the rear end of the said link 27 being pivotally connected with the forward end of one of the slides 18.

A radially disposed arm 28 is mounted upon the shaft 23, and a connecting rod 29 is pivotally attached at its rear end with the outer end portion of the said arm 28, and at its forward end is pivotally connected with the other crank 5 of the axle 4. A radially disposed arm 30 is also mounted upon the shaft 23, and the outer portion of the said arm 30 is connected with the other slide 18 by means of a link 31, which is pivotally connected at its rear end to the outer extremity of the arm 30, and at its forward end with the rear end of the slide 18 referred to. A partition 32 is detachably located in the hopper 14, and divides the interior of the same into two compartments.
Brushes 33 are located against the front and rear sides of the hopper 14, and upon the lower portion of the partition 32, and are adapted to prevent material from passing from one compartment to the other, and out of the hopper at either end thereof. The said brushes bear against the upper surfaces of the slides 18. A standard 34 is attached to the intermediate beam 2, and is provided at its lower end with a furrow-opening plow 35, of bull tongue type. Standards 36 are attached to the rear end portions of the side beams 1 and are held in proper position by means of braces 37, which, at their upper ends, are attached to the said beams, and at their lower ends to the lower portions of the said standards. The said standards 36 carry closing plows 38, preferably of the bull tongue type. A cross rod 39 is located in the forward or larger compartment in the hopper 14 and upon the said rod is pivoted an agitator 40. The said agitator is held in proper position with relation to the lateral sides of the hopper 14 by means of sleeves 41, which receive the rod 39 and bear at their inner ends against the opposite sides of the agitator 40, and at their outer ends against the inner surfaces of the sides of the hopper 14. The agitator 40 is provided with depending fingers 42 (preferably three in number). An operating rod 43 is pivotally connected at one end with one of the slides 18, and at its other end with the intermediate finger 42 of the agitator 40.
Eyes 44 are attached to the inner side of one of the side beams 1, and a chute 45 is provided at its upper edge with eyes 46. A rod 47 passes through the eyes 44 and 46 and serves as a pintle for hinged connections between the chute 45 and the beams 1, from which it hangs pendent. The lower end of the chute 45 terminates just behind the plow 35. A space 48 is provided in the lower portion of the block 16, and at its inner end communicates with the upper portion of the opening 17 in the bottom of the hopper 14. A valve 49 is located in the said space, and at its inner end is adapted to pass transversely across the upper portion of the opening 17, and the opposite end portion of the said valve 49 projects beyond the outer side of the hopper 14. The valve 49 may be moved longitudinally in the recess 48, whereby the outlet capacity of the opening 17 may be increased or diminished.

From the above description it is obvious that when the implement is used as a fertilizer dropper only, the partition 32 may be removed from the hopper 14, and the said hopper may be filled with the material to be dropped. As the implement is passed along the surface of the soil the axle 4 is rotated in consequence of the frictional contact between the soil and the wheel 6. At the same time a furrow is opened by the plow 35. By reason of the connecting rods 25 and 29 the shafts 22 and 23 are rocked, and, through the connecting links 27 and 31, the slides 18 are moved longitudinally and alternately in opposite directions. As the recesses 19 move over the bottom of the hopper 14 they accumulate the material contained within the hopper, and when the said recesses 19 move over the opening 17, the material accumulated in the said recesses falls through the said opening and into the chute 45.

When it is desired to drop seed and fertilizer at the same time, the partition 32 is inserted into the hopper 14, and the fertilizer is placed in that compartment containing the agitator 40, while the seed is contained in the other compartment. The implement is drawn along the ground as heretofore described, and as the slides 18 reciprocate longitudinally in opposite directions the fertilizer passes down from the hopper 14 through the recesses 19, while the seeds are caught in the recesses 21 and carried beyond the end of the bottom of the hopper 14, and deposited in the chute 45. The fingers 20 in the recesses 19 prevent the fertilizer from passing through the opening 17 in lumps, or from choking in the said opening 17. In either instance, after the material has been deposited it is covered in the furrow by the covering plows 38. As the slides 18 reciprocate the agitator 40 is maintained in motion by reason of the connecting link 43 with one of the fingers 42. Thus it is impossible for the fertilizer to pack in the hopper, as the movement of the said agitator will maintain the said material in a pulverized or practically pulverized condition.

It will be understood that when the implement is used for cultivating purposes, the opening plow 35 may be removed from the central beam 2 and attached to either one of the side beams 1, 1, as desired, and also the positions of the closing plows 38 may be changed upon the beams as occasion or fancy may require.

Having described my invention, what I claim as new, and desire to secure, by Letters Patent, is:

1. In combination with a hopper slides mounted therein, means for moving the said slides, the said slides having recessed edges provided with fingers, and an agitator mounted in the hopper and operatively connected with the slides.

2. A planter comprising a wheel-mounted frame, a hopper located upon the frame, slides mounted in the hopper for longitudinal movement, shafts journaled in the frame, one in advance of the hopper, and the other behind the hopper, means operatively connecting the said shafts with the slides, and means for rocking the said shafts.

3. A planter comprising a wheel-mounted frame, a hopper mounted upon the frame, slides mounted in the hopper, shafts journaled in the frame, one in advance of the hopper and the other at the rear of the hopper, radially disposed arms carried by the shafts, links operatively connecting the said arms with the slides, and means for rocking the shafts.

4. A planter comprising a wheel-mounted frame, a hopper mounted upon the frame, slides located in the hopper, shafts journaled in the frame, one in advance of the hopper, and another at the rear of the hopper, said shafts having radially disposed arms, links pivotally connected at their outer ends with the said arms, and at their inner ends with the said slides, means for rocking the shafts, and a chute hingedly attached to the frame and located below the hopper.

5. A planter comprising a wheel-mounted frame, a hopper located thereon, slides located in the hopper, shafts journaled in the frame, one in advance of the hopper and another at the rear of the hopper, means operatively connecting the said shafts with the slides, an agitator located in the hopper, and means operatively connecting the agitator with one of the slides.

6. A planter comprising a wheel-mounted frame, a hopper located upon the frame, slides located in the hopper, shafts journaled in the frame, one in advance of the hopper and the other at the rear of the hopper, means operatively connecting the shafts with the slides, an agitator pivotally mounted in the hopper and having depending fingers, and a rod pivotally connecting one of the fingers of the agitator with one of the slides.

In testimony that I claim the foregoing as my own I have hereto affixed my signature in the presence of two witnesses.

EDGAR C. ROLLINS.

Witnesses:
B. H. ROGERS,
S. R. SCOTT.